United States Patent [19]

Bieber

[11] 4,440,272

[45] Apr. 3, 1984

[54] APPARATUS FOR CONTROLLING THE BRAKING EFFECT OF A HYDRAULIC RETARDER

[75] Inventor: Gerold Bieber, Langenargen, Fed. Rep. of Germany

[73] Assignee: Zahnradfabrik Friedrichshafen AG, Friedrichshafen, Fed. Rep. of Germany

[21] Appl. No.: 290,962

[22] Filed: Aug. 7, 1981

[30] Foreign Application Priority Data

Aug. 12, 1980 [DE] Fed. Rep. of Germany ....... 3030494

[51] Int. Cl.³ .................... F16D 57/00; F16D 65/78; B60K 41/26
[52] U.S. Cl. .................................. 188/290; 192/4 B; 60/337; 188/264 E
[58] Field of Search ............... 188/290, 296, 264 E; 222/54; 192/4 A, 4 B, 12 A, 30 W, 3.58; 60/337

[56] References Cited

U.S. PATENT DOCUMENTS

| 3,090,195 | 5/1963 | Fisher et al. | 60/337 |
|---|---|---|---|
| 3,451,511 | 6/1969 | Knapp | 188/264 E |
| 3,533,493 | 10/1970 | Braun | 188/296 |
| 3,593,828 | 7/1971 | Klein | 188/290 |
| 3,952,508 | 4/1976 | Bopp | 188/296 |
| 4,061,214 | 12/1977 | Ternehäll | 188/290 |
| 4,072,220 | 2/1978 | Hamada | 192/3.58 |

FOREIGN PATENT DOCUMENTS 2012922A 1/1979 United Kingdom.

OTHER PUBLICATIONS

Manual entitled "Retarder for ZF Transmatic", Zahnradfabrik Friedrichshafen AG, Friedrichshafen, W. Germany, Oct. 1978.

*Primary Examiner*—Bruce H. Stoner, Jr.
*Assistant Examiner*—Robert J. Oberleitner
*Attorney, Agent, or Firm*—Karl F. Ross; Herbert Dubno

[57] ABSTRACT

A hydraulic retarder, especially for an automotive vehicle, comprising a control valve which regulates the pressure of the hydraulic fluid supplied to the decelerator which can be connected to a heat exchanger for dissipating the thermal energy generated by the retardation of the vehicle. According to the invention a regulating valve is additionally provided for controlling the maximum pressure in dependence upon temperature and in response to a temperature sensor. The device thus limits the maximum retarder effect in accordance with the temperature of the hydraulic medium and hence the utility of the heat exchanger to dissipating the braking energy.

2 Claims, 7 Drawing Figures

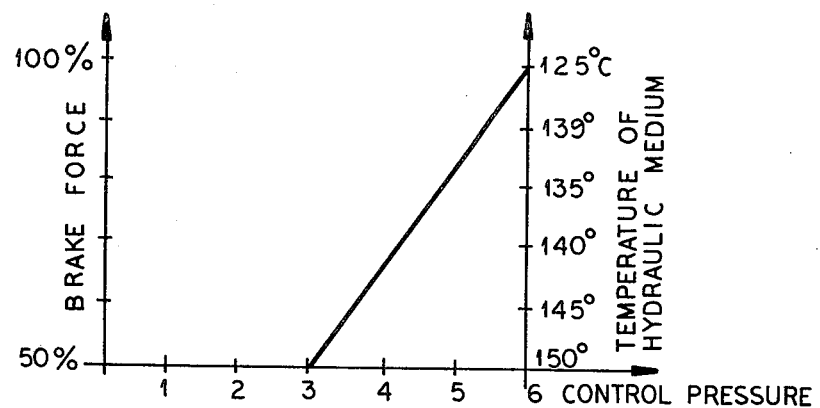
FIG.4
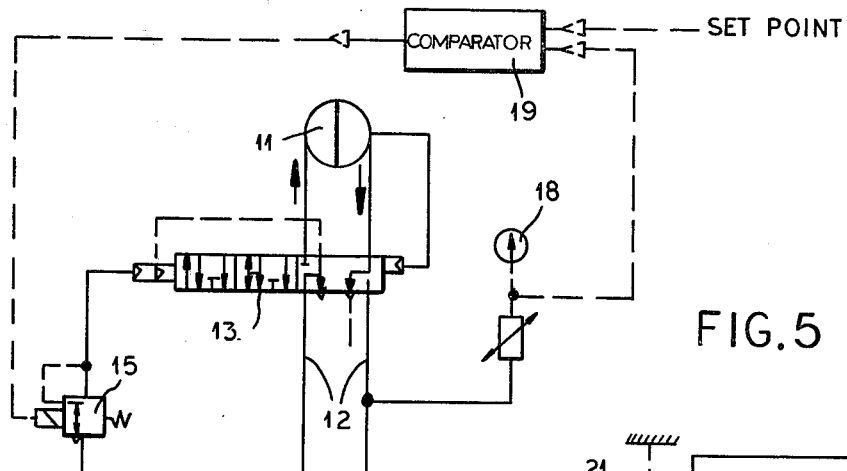
FIG.5
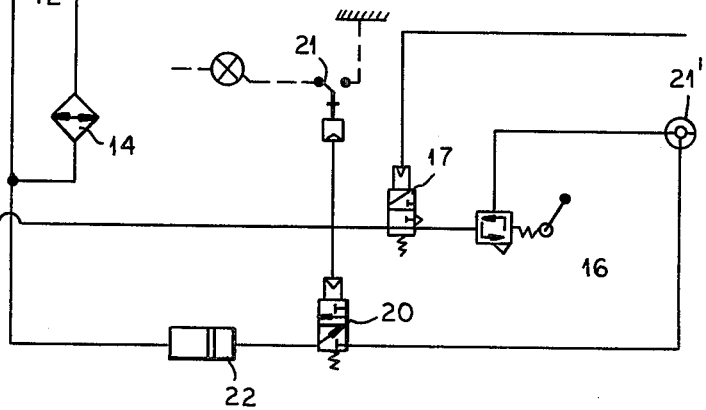

APPARATUS FOR CONTROLLING THE BRAKING EFFECT OF A HYDRAULIC RETARDER

FIELD OF THE INVENTION

My present invention relates to hydraulic retarders or decelerators and, more particularly, to baking devices of the hydrodynamic type which apply a drag to a rotating shaft and which can be used for automative vehicles in addition to the usual wheel brakes. More particularly the invention relates to improvements in the control of hydraulic retarders and in the monitoring of the operation thereof.

BACKGROUND OF THE INVENTION

Hydraulic retarders or decelerators of the hydrodynamic type generally comprise at least one rotatable member (rotor) coupled to a shaft(e.g. the drive shaft of an automotive vehicle such as a heavy truck or other massive vehicle), a stator juxtaposed with the rotor, and a heat exchanger. The rotor generates a circular flow of the hydraulic fluid through compartments in the rotor and stator and, in addition, displaces the fluid through the heat exchanger with the fluid exerting the drag upon the rotor and thereby retaining rotation of the shaft. Because of the conversion of kinetic energy of the vehicle, resulting from the braking or retarding action, the fluid is heated and the heat must be dissipated in the heat exchanger.

The braking effect (or force) is dependent upon the pressure in the hydraulic retarder. Consequently, the hydraulic retarder is usually associated with a control valve having a hand or foot actuated member for regulating the braking effect.

Hydrodynamic decelerators of this type can be used on heavy vehicles operating at high velocities, where pad-type friction brakes are less effective, the vehicles generally also having such friction brakes which can be brought into operation when the speed of the vehicle is reduced, e.g. by a combination of engine braking and the use of hydraulic retarder, since the hydraulic retarder is less effective in terms of braking efficiency and lower speeds.

The braking effect is varied as a function of the applied oil pressure because the friction between the rotor and the hyraulic fluid and between the stator and the hydraulic fluid is directly proportional to the oil pressure. As the pressure is incresed, the braking effect is increased becauase the friction force increases and the generation of heat, resulting from increased retardation, likewise increases.

In water-cooled engines, the dissipation of the heat is effected through a heat exchanger which can utilize the cooling water whereas in air-cooled engines the heat exchanger dissipates the heat to the cooling air.

Thus different degrees of filling of the hydraulic circuit produce different braking effects on the vehicle and it is possible by controlling the filling or, put otherwise, hydraulic pressurization of the decelerator, to vary the braking effect in a stepless manner from a maximum value to zero. The maximum braking moment or torque which can be developed will depend upon the gear which is engaged and hence the transmission ratio between the engine and the wheels. Even if it is in highest gear, the braking effect is significant so that, as a rule, non downshifting is required. In secondary retarders, the retarder torque or moment is equal to the braking moment or torque. The braking force can be limited as required, being a maximum of 1000 Nm on the drive side in conventional systems.

Experience has shown that conventional systems frequently cannot be operated most effectively because the heat exchanger can no longer dissipate all of the heat of the fluid generated by a particular retarding action. The invention is therefore based upon the discovery that both the possible and desirable braking forces can considerably exeed the capacity of the heat exchanger or cooling device used to dissipate the heat evolved and corresponding to the braking effect generated.

When short applications of the hydraulic retarders are utilized, the retarder, the liquid circulating path, and the heat exchanger generally can absorb the heat generated even with the development of very high braking forces. However, with high braking forces and long braking periods, the limited oil volume, the capacity of the heat exchanger and like phenomena detrimentally affect the ability to dissipate the heat which is produced and overheating of the hydraulic fluid can occur. Such overheating can lead to failure of the transmission and/or the engine.

OBJECTS OF THE INVENTION

It is the principal object of the present invention to provide an improved hydraulic retarder or decelerator system which obviates the disadvantages of earlier systems and especially the disadvantages enumerated above.

A more specific object of the invention is to provide a system for monitoring or control of a hydraulic retarder, to prevent overheating of the retarder or the hydraulic fluid even with prolonged operation of the retarder, while enabling control of the retarder force continuously down to a permissible value.

Another object of the invention is to provide a simplified control system for a hydraulic retarder.

SUMMARY OF THE INVENTION

The foregoing objects and others which will become apparent hereinafter are attained, in accordance with the present invention, in a hydraulic retarder or decelerator system provided with means for controlling or metering the braking effect and which comprises a hydraulic retarder having a stator which can be connected to the vehicle chassis, a rotor connected to a shaft coupled with the wheels of the vehicle, a heat exchanger connected to the hydraulic retarder formed by the stator and rotor, and a control valve connected in the hyraulic circuit formed by the retarder and the heat exchanger for regulating the pressure or filling of hydraulic fluid in the retarder and thereby controlling the braking effect, this control valve being displaceable, in turn, by the vehicle operator. The latter control valve can be shifted by manual or pedal operations.

According to the invention, a further regulating or limiting valve is provided and is operatively connected with the aforementioned hydraulic circuit to limit the pressurization or filling of the retarder to a maximum determined by the temperature of the circulating fluid, preferably prior to its entry into the heat exchanger, the regulating valve being connected operatively to a temperature sensor for this purpose.

The regulating valve, which is preferably a pressure-reducing or pressure-limiting valve, can be provided in the circuit of the flowing medium or in a separate circuit (servocircuit) by which the control valve is hydraulically operated by the pedal or manual lever described previously.

According to a feature of the invention, the temperature sensor can respond either to the temperature of the flowing medium or to the temperature of a coolant circulated through the heat exchanger. The temperature sensor can be an electrical device which can feed a signal proportional to the temperature to a control circuit provided with a set point value or program of values, the output of this circuit being applied, in turn, to the regulating valve which likewise should be electrically operated. The control circuit can be programmed to regulate the operation of the retarder so that the brake force corresponds to the fading characteristics of a friction brake.

In the apparatus of the present invention, therefore, the maximum brake force is adjusted in water-cooled engines by the cooling water temperature and in air-cooled engines preferably by the temperature of the oil or hydraulic fluid in the retarder itself.

The regulating valve is preferably a pressure-reducing or limiting valve which limits the pressure of the flowing medium, i.e. the oil, fed to the retarder independently of the control valve actuated by the operator to a maximum value which still permits effective dissipation of the heat evolved in the braking operation, i.e. sufficient heat dissipation to enable retention of a substantial fraction of the original braking effect.

BRIEF DESCRIPTION OF THE DRAWING

The above and other objects, features and advantages of the present invention will become more readily apparent from the following description, reference being made to the accompanying drawing in which:

FIG. 4 is a graph illustrating a similar relationship involving the transmission oil temperature;

FIG. 5 is a flow diagram of a portion of a retarder control system with temperature-dependent regulation in accordance with the instant invention;

SPECIFIC DESCRIPTION

Figure 1:
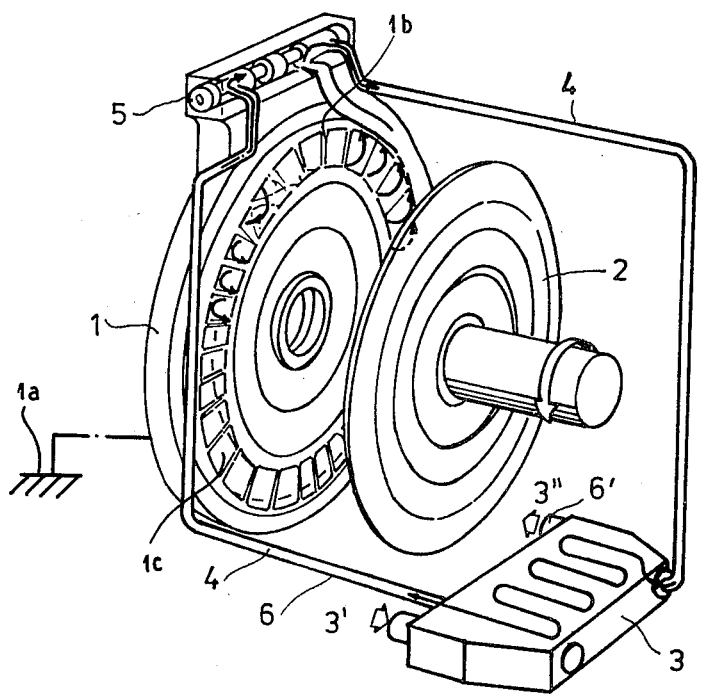
FIG. 1 is a perspective view in highly diagrammatic form showing a hydrodynamic brake or hydraulic retarder in accordance with the present invention but certain elements being in exploded form.

FIG. 1 of the drawing shows a hydrodynamic brake or hydraulic decelerator or retarder for a heavy automotive vehicle such as a truck or track vehicle, the hydraulic retarder comprising a stator 1 which can be connected to the chassis or body of the vehicle as represented at 1a in highly diagrammatic form. This stator, which is formed with vanes 1b and fluid circulating compartments 1c in a conventional manner, is juxtaposed with the vaned side of a rotor 2 which can be connected in a conventional manner via a clutch, transmission, and/or universal joint shaft, to an axle of the vehicle to be braked.

The deflection of the oil flow in the stator frictionally retards the rotary movement of the rotor and hence the speed of the vehicle, the retarding energy being transformed into heat which raises the temperature of the hydraulic medium.

The oil pressure in the interior of the retarder is controlled, as shown in FIG. 1, by a control device, e.g. a spool-type valve which, in turn, can be displaced mechanically or by a pneumatic or vacuum-operated piston or a hydraulic piston controlled by a hand-actuated member or a foot-actuated member, e.g. a pedal.

The position of the control valve 5 varies the oil pressure and therefore the circulating of oil through lines 4 to and from a heat exchanger 3. When the vehicle has a water-cooled engine, water from the radiator can be circulated by the water pump of the engine into the heat exchanger 3' and is returned to the radiator through an outlet fitting 3''.

In an embodiment of the invention in which the engine is air-cooled, the enging fan may blow air through the heat exchanger 3.

In the first embodiment, the temperature can be sensed at a location 6', i.e. to detect the temperature of the cooling liquid. In either embodiment, the temperature can be detected in the region of the heat exchanger 3 for the purposes described below.

Temperature monitoring cac be effected by any temperature-sensing means, e.g. a thermocouple and amplifier or the like. Preferably the temperature sensor produces an electrical signal which controls the regulating valve or element to be described below.

Figure 2:
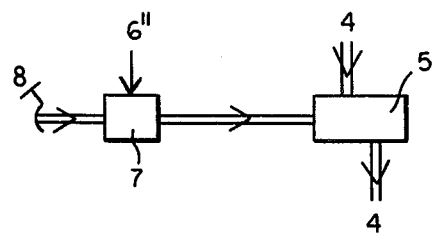
FIG. 2 is a block diagram of a valve arrangement for use with the system of the present invention.

The functioning of the system is illustrated diagrammatically in FIG. 2 in which the block 5 represents the control valve, member 8 representing a pedal actuator for the control valve and the regulating element is shown at 7.

The pedal 8 thus actuates the control valve 5 and, in accordance with feedback servomechanism techniques, can be constructed so that a heavier force is required upon the pedal to increase the oil pressure in the retarder further.

According to the invention, the oil pressure in the retarder is limited as a function of temperature by the regulating element 7 which can be a pressure-reducing valve and thus can diminish the force delivered by the pedal to the control valve 5 as the temperature increases, the temperature-dependent input being delivered to the valve 7 as represented at 6''.

The result is a limitation of the oil pressure in the retarder to apply a pedetermined brake force and prevent the evolution of heat beyond the predetermined corresponding valve when the temperature at the heat exchanger is at a particular level.

Figure 3:
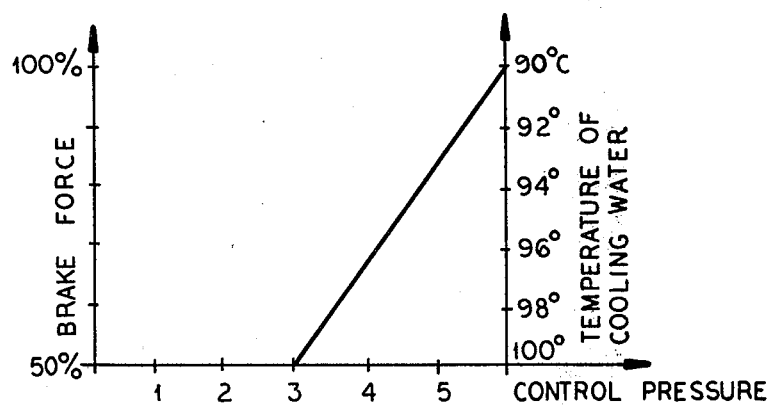
FIG. 3 is a graph illustrating the relationship between braking force, control pressure and the temperature of the cooling water for the purposes of explaining the present invention.

FIGS. 3 and 4 are diagrams illustrating the dependence of the braking force and control pressure upon the temperature of the cooling water or the temperature of the retarder oil, respectively.

In these diagrams, the control pressure has been plotted along the abscissa while the braking force in percentage of maximum is plotted along the left-hand ordinate. In FIG. 3, the cooling water temperature has been plotted along the right-hand ordinate and in FIG. 4 the right-hand ordinate displays the retarder oil temperature.

As the two graphs show, the maximum control pressure at 90° C. of the cooling water or 125° C. of the oil can correspond to 100% braking force and the control pressure delivered to the valve 5 is reduced from its maximum value of 6 bar to, say, 3 bar as the detected temperature of the cooling water rises to 100° C. or the detected oil temperature rises to 150° C. in accordance with the present invention.

These values are of course exemplary and other control curves can be utilized as desired.

FIG. 5 shows in somewhat greater detail a control arrangement in accordance with the invention. In this FIG., the retarder has been represented diagrammatically at 11 and is shown to be connected by oil circulation lines 12 and the control valve 13 with a heat exchanger 14.

In this embodiment, moreover, a hand-operated lever 16 feeds fluid to displace the valve member 13 via a pressure-limiting valve 15 which is electrically controlled via comparator 19 receiving an input from an electrical temperature sensor 18 which can also have a gauge. The set point value introduced into the comparator is compared with the measured temperature and the comparator delivers an output which adjusts the limiter 15 in accordance with the curve of FIG. 3 or FIG. 4.

Valve 17 in line between the actuator 16 and limiter valve 15 can permit operation of the hydaulic retarder when the clutch is engaged and thus ca be operated by the clutch-actuating system whereas a further valve 20 permits operation of the retarder under the control of the ignition switch 21 of the vehicle. A pressure reservoir has been represented at 21' and a floating piston 22 may serve to isolate the valve actuating system from the hydraulic circulation generated by the retarder.

According to the invention, the measured temperature value is converted into a signal transformed and amplified by the circuit 19 such that the brake force is controlled in accordance with the fading of a friction brake.

Figure 6:
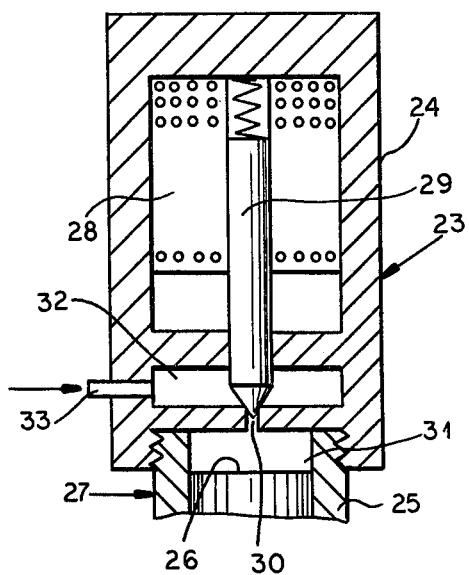
FIG. 6 is a diagram illustrating a pressure control valve in accordance with this invention.

This system can, of course, be modified to combine the pressure-reducing valve and the control valve in a single structural unit as represented diagrammatically in FIG. 6, for example, where the regulating valve 23 is formed as a cover 24 and upon the housing 25 whose plunger 26 can constitute the spool of the control valve 27. In this case, a coil constituting the control magnet can be mounted at 28 in the cover 24 and can control a pin 29 for selective blocking and unblocking an orifice 30 between a pressurizable chamber 31 to one side of the valve spool 26 and a chamber 32 connected by a line 33 with the source of the control pressure.

Figure 7:
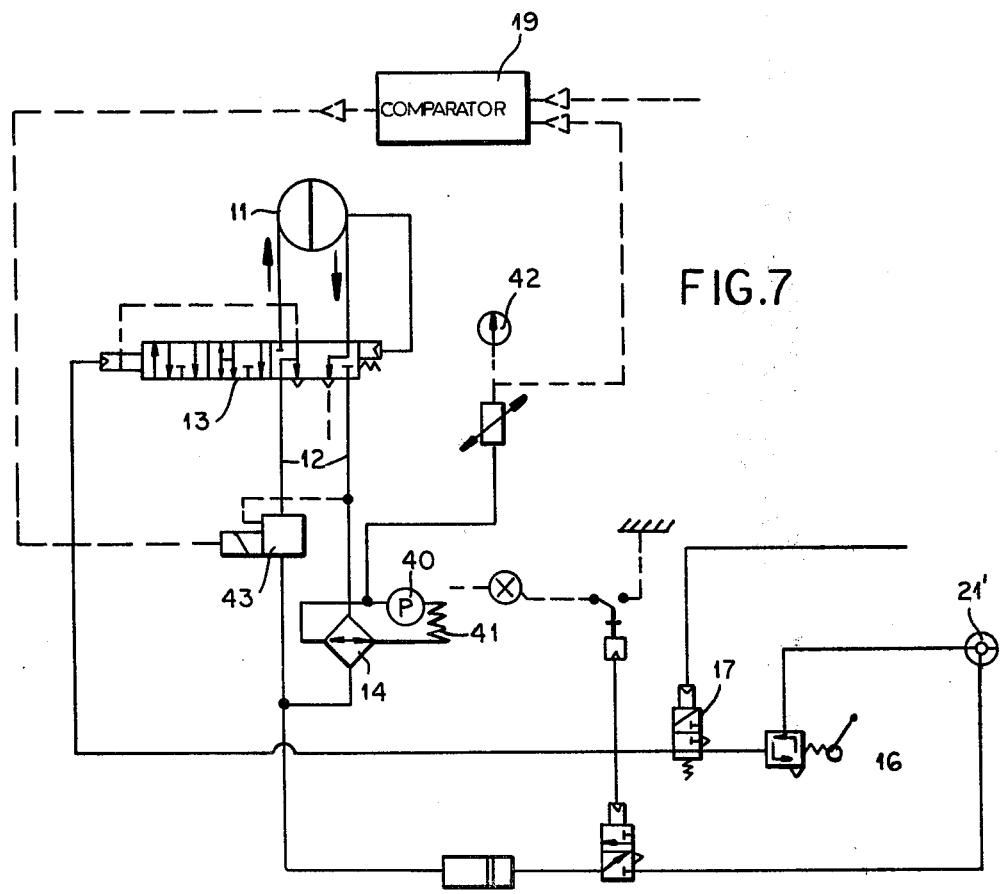
FIG. 7 is a diagram similar to FIG. 5 but illustrating another embodiment thereof.

FIG. 7 shows an embodiment of the invention similar to that of FIG. 5 and wherein similar structural elements have been designated by corresponding numerals. In this embodiment, the heat exchanger 14 is fed with cooling water by the vehicle pump 40, the water circulating through the radiator 41 of the vehicle. The temperature of the cooling water is detected by the sensor 42 and a corresponding electrical signal is supplied to the comparator 19 to operate a pressure-limiting valve directly in one of the oil circulating lines. The valve is represented at 43.

I claim:

1. In a hydraulic retarder system for a vehicle comprising a hydraulic retarder applying a braking force variable in response to hydraulic pressure in said retarder and connected in a hydraulic circulation path with a heat exchanger for dissipating heat from the hydraulic fluid of said retarder, and a control valve responsive to control pressure for varying said hydraulic pressure, said control pressure being a function of displacement of an operator-controlled element, the improvement which comprises the combination therewith of:

sensing means including a temperature sensor having an electrical output signal for detecting the temperature at said heat exchanger;
   a regulator connected to said sensing means and including a pressure-limiting valve connected between said element and said control valve for limiting said control pressure and for reducing the hydraulic pressure in said retarder independently of the operation of said element to a maximum level determined by the sensed temperature; and
   electronic circuit means for transforming said signal into an output controlling said regulator in dependance on the fading of a friction brake.

2. The improvement defined in claim 1 wherein said pressure-limiting valve is provided with a control magnet and forms a cover of said control valve.

* * * * *